(12) United States Patent
Smith

(10) Patent No.: US 6,681,434 B2
(45) Date of Patent: Jan. 27, 2004

(54) DUAL SIDED DISPOSABLE CLEANING CLOTH

(75) Inventor: James A. Smith, Chatham, MA (US)

(73) Assignee: Watch Hill Harbor Technologies, Chatham, MA (US)

(*) Notice: Subject to any disclaimer, the term of this patent is extended or adjusted under 35 U.S.C. 154(b) by 0 days.

(21) Appl. No.: 09/995,134

(22) Filed: Nov. 27, 2001

(65) Prior Publication Data

US 2003/0097725 A1 May 29, 2003

(51) Int. Cl.[7] .................. B08B 1/00; A46B 17/04; A47L 13/44; A47L 13/10; A47L 13/12
(52) U.S. Cl. .................. 15/104.93; 15/104.94; 15/223; 15/209.1; 15/118; 15/229.1; 15/247
(58) Field of Search .............. 15/104.93, 104.94, 15/223, 209.1, 210.1, 118, 229.1, 208, 247

(56) References Cited

U.S. PATENT DOCUMENTS

| | | |
|---|---|---|
| 960,158 A | 5/1910 | Cummings et al. |
| 1,080,572 A | 12/1913 | McDonald |
| 1,138,305 A | 5/1915 | Miller |
| 1,476,396 A | 12/1923 | Dickson |
| 1,929,082 A | 10/1933 | Simon |
| 2,221,305 A | 11/1940 | Chase |
| 2,269,424 A | 1/1942 | Bernstein |
| 2,293,461 A | 8/1942 | Gougeon |
| 2,382,205 A | 8/1945 | Coats |
| 2,446,814 A | 8/1948 | Crofton |
| 2,655,680 A | 10/1953 | Geerin |
| 2,709,824 A | 6/1955 | Hall |
| 2,733,470 A | 2/1956 | Wilder |
| 2,816,313 A | * 12/1957 | Beck et al. ............ 15/210.1 |
| 2,858,559 A | 11/1958 | Carlson |
| 2,963,731 A | 12/1960 | Hoots |
| 2,999,265 A | * 9/1961 | Duane et al. ............ 424/443 |
| 3,221,356 A | * 12/1965 | Schirmer ............ 15/210.1 |
| 3,339,220 A | 9/1967 | Barry |
| 3,380,504 A | 4/1968 | Green |
| 3,400,420 A | 9/1968 | Granville et al. |
| 3,462,790 A | 8/1969 | Lingle |
| 3,737,938 A | 6/1973 | Saltzstein |
| 3,896,518 A | * 7/1975 | Von Post et al. ........ 15/104.94 |
| 3,913,164 A | 10/1975 | Semenchuk |

(List continued on next page.)

FOREIGN PATENT DOCUMENTS

FR 2575058 12/1985

Primary Examiner—Robert J. Warden, Sr.
Assistant Examiner—Laura C Cole
(74) Attorney, Agent, or Firm—Connolly Bove Lodge & Hutz LLP

(57) ABSTRACT

A disposable dual sided cleaning cloth is in the form of a laminate having outer layers which are preferably made of non-woven material. The outer layers are secured together by an intermediate hydrophilic polyurethane absorbent foam coating which contains at least one cleaning ingredient.

25 Claims, 3 Drawing Sheets

U.S. PATENT DOCUMENTS

| | | |
|---|---|---|
| 4,455,705 A | 6/1984 | Graham |
| 4,823,427 A | 4/1989 | Gibbs et al. |
| 4,852,210 A | 8/1989 | Krajicek |
| 4,945,599 A | 8/1990 | Flynn |
| 5,012,544 A | 5/1991 | Verry |
| 5,042,105 A | 8/1991 | Buck et al. |
| 5,094,559 A | 3/1992 | Rivera et al. |
| 5,138,738 A | 8/1992 | Nicholson |
| 5,177,831 A | 1/1993 | Wirth |
| 5,217,787 A * | 6/1993 | Monahan .................... 428/134 |
| 5,280,664 A | 1/1994 | Lin |
| 5,419,015 A | 5/1995 | Garcia |
| 5,525,397 A | 6/1996 | Shizuno et al. |
| 5,709,006 A | 1/1998 | Carter, Jr. |
| 5,953,784 A | 9/1999 | Suzuki et al. |
| 5,964,005 A | 10/1999 | Williams et al. |
| 6,058,548 A | 5/2000 | Footer et al. |
| 6,105,193 A | 8/2000 | Williams et al. |
| 6,380,151 B1 | 4/2002 | Masters |
| 6,579,023 B2 | 6/2003 | Kunkler et al. |
| 2002/0083964 A1 | 7/2002 | McKay |
| 2002/0152569 A1 | 10/2002 | Zorzo |
| 2003/0035679 A1 | 2/2003 | Zorzo |
| 2003/0044569 A1 | 3/2003 | Kacher et al. |
| 2003/0049407 A1 | 3/2003 | Kacher et al. |
| 2003/0095826 A1 | 5/2003 | Policicchio et al. |
| 2003/0110584 A1 | 6/2003 | Clare et al. |

* cited by examiner

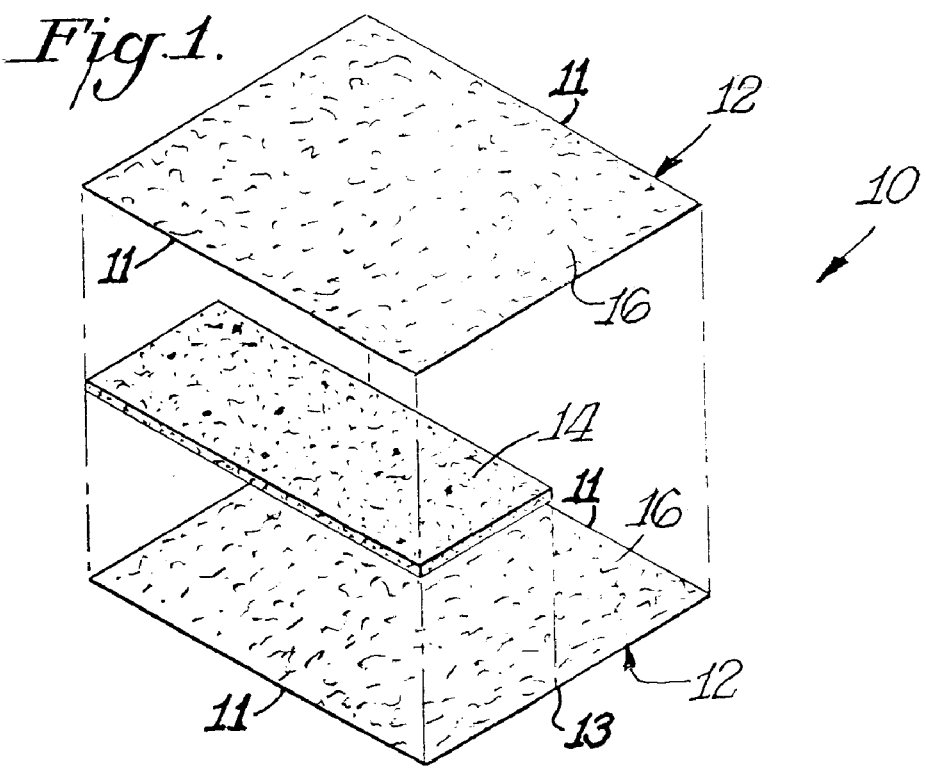
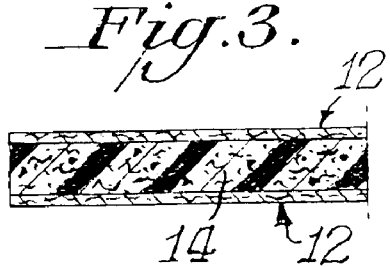

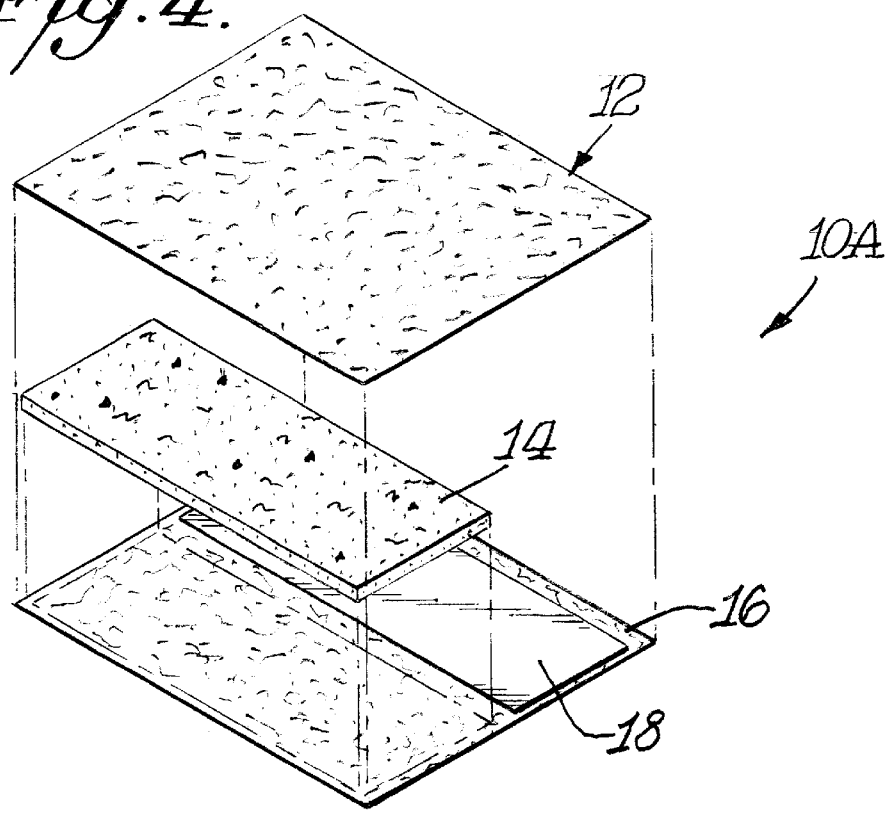
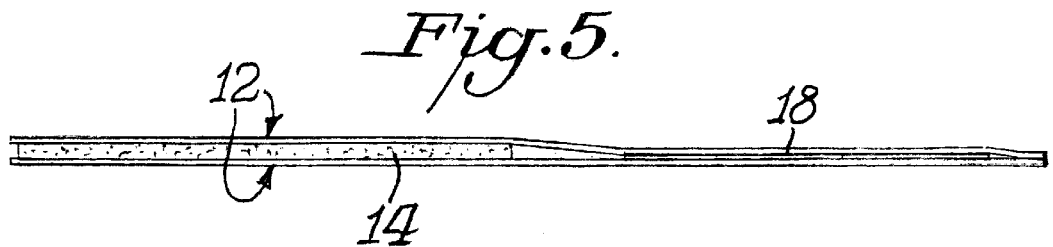

DUAL SIDED DISPOSABLE CLEANING CLOTH

BACKGROUND OF THE INVENTION

Cleaning cloths have widespread usage by being manually held and manipulated in the cleaning operation. Cleaning cloths have also been used by being secured to some type of implement, such as a broom or mop.

SUMMARY OF THE INVENTION

An object of this invention is to provide a dual sided disposable cleaning cloth which can be economically made with enhanced cleaning ability.

In accordance with this invention, a very thin foam coating or layer is provided between a pair of porous outer layers and preferably is located in an area comprising less than the full area of the layers. Preferably the foam covers one-half of the area to form a cleaning area. The portion of the laminate cloth free of the foam could function as a rinsing area. Preferably cleaning agents are incorporated in the foam. If desired, enhancements could be incorporated into the rinsing area.

The cloth could be used by being detachably secured to a broom or other implement.

THE DRAWINGS

FIG. 1 is a perspective exploded view showing a cleaning cloth in accordance with this invention;

FIG. 2 is a side elevational view of the cleaning cloth shown in FIG. 1 in its assembled condition;

FIG. 3 is a fragmental cross-sectional view of a portion of the cleaning cloth shown in FIGS. 1–2;

FIG. 4 is a perspective exploded view of a modified cleaning cloth in accordance with this invention;

FIG. 5 is a side elevational view of the cleaning cloth shown in FIG. 4 in its assembled condition;

DETAILED DESCRIPTION

Figure 6:
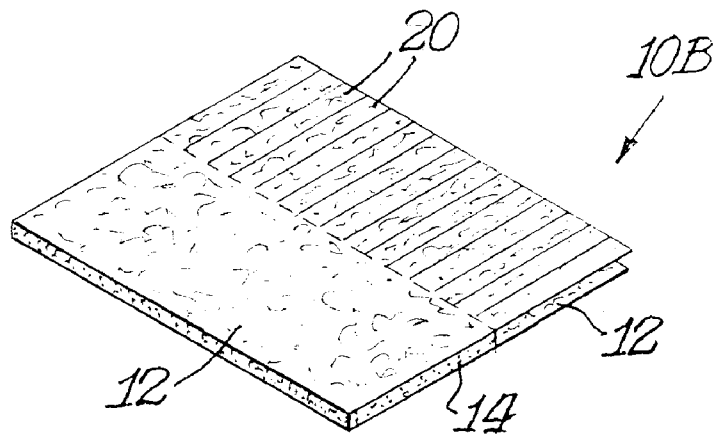
FIG. 6 is a perspective view of yet another modified cleaning cloth in accordance with this invention.

FIGS. 1–3 illustrate a cleaning cloth 10 in accordance with this invention. As shown therein a laminate is formed which includes upper and lower layers or cover sheets 12,12 having an intermediate foam layer 14. Foam layer 14 could in the broad practice of this invention completely cover the layers 12,12. Preferably, however, the foam layer 14 covers only a portion of the layers 12,12 are such as between ⅓ and ⅔ and preferably one-half of the area. As shown in FIGS. 1–2 each outer layer 12,12 has a peripheral edge with a center line 13 located equally between side edges 11,11. Thus, where the outer layers 12,12 are of rectangular shape intermediate foam lay 14 would be rectangular shape but would be only one-half as long as the outer layers 12,12 while having generally the same length on the three remaining edges.

The foam layer 14 can extend completely outwardly so that one or more of its three edges extend all the way to the edges of the outer layers or cover sheets 12,12 as illustrated. Alternatively, the foam layer could have its edges terminate inwardly of the cover sheets. What is important is that the foam layer extends over a significant area of the cover sheets, such as one-half, so as to provide a sufficient cleaning area.

Outer layers 12,12 can be made of any suitable material, such as non-woven fabric, paper, polyethylene foam, polyurethane foam, etc. Preferably, the layers 12,12 are of non-woven material. The non-woven layers provide sites for Velcro® hooks on a cover attachment of a cleaning head of a cleaning implement to hang on the cleaning side or underside of the cleaning implement such as a broom or mop. Thus one side or layer 12 would be secured to the implement, while the other side which would be the exposed or top side does the cleaning. The invention may be broadly practiced where the exposed cleaning layer or sheet is porous but the mounting sheet is not porous.

Foam layer 14 is preferably a very thin filled hydrophilic polyurethane foam coating in a rectangular shape running down one-half of the cleaning cloth to provide efficient cleaning. Opposite the same side of the cloth there is an area 16 of each layer 12,12 that is not in contact with and is located away from the foam layer 14. The non-woven area 16 serves as a rinsing side to leave, for example, the floor clean. If desired, certain enhancements could be incorporated into this rinsing side, such as a hydrophilic polyurethane film coating thinner than the layer 14 with the film containing super absorbent polymers, etc. to facilitate absorption of excess water and soils.

The intermediate layer 14 preferably includes some cleaning agent. In addition foam layer 14 can function as a means for securing the layers 12,12 together thereby leaving the areas 16,16 of layers 12,12 free of attachment which would permit the portions 16,16 to be moved into contact with each other or moved away from each other. If desired, however, the free portions 16,16 could be secured together in any suitable manner such as by heat seal or by an adhesive.

The dual sided disposable cleaning cloth 10 can be mounted to a cleaning implement such as a broom and could be used in the manner described in copending application Ser. No. 09/917,069 filed Jul. 27, 2001, all of the details of which are incorporated herein by reference thereto. Thus, the dual sided disposable cleaning cloth 10 could be attached to a broom or other cleaning implement with various types of fastening devices, such as hook/loop fasteners. As disclosed therein, the wipe or cleaning cloth is detachably mounted to the cover attachment to cover the bottom of the cover attachment across the bottom of the cleaning head when the wipe is mounted directly to the cleaning attachment and the wipe exposes the bottom of the cleaning attachment when the wipe is detached from the cover attachment.

The foam layer 14 preferably contains active ingredients such as detergents, wood floor polish ingredients, etc. which are accessed through the porous outer layers 12,12. The cloth 10 can be either dry or premoistened. The foam layer 14 would function as the cleaning service for the cloth in the primary cleaning operation. The free areas 16,16 could function as a mop-up or final cleaning side after the cleaning or scrubbing side incorporating foam layer 14 has been used. Preferably, the foam layer 14 is a hydrophilic polyurethane absorbent foam containing abrasive, short fibers, detergents and processing aides. Examples of abrasive materials include feldspar, pumice or other inorganic materials (nano particles). These abrasives are held in the foam by using a very small amount of a suitable material such as organo silane which bridges the particle and polymer matrix. The short fiber filler facilitates the movement of the cleaning agents or surfactants from the foam out to the surface. This provides faster and more efficient cleaning. Fragrances or preservatives may be used by being incorporated in the foam material and/or outer layers to provide a fresh odor to the cleaning step and the cloth itself. Preservatives could be used to prevent bacterial and fungal growth.

The following is a general formulation for the foam layer.

| Ingredients | % (parts) |
|---|---|
| Water | 38.63 |
| Surfactant A | 0.15 |
| Surfactant B | 0.07 |
| Blowing agent | 0.50 |
| Filler | 5.00 |
| Abrasive | 40.00 |
| Organo Silane | 0.05 |
| Fragrance | 0.50 |
| Preservative | 0.10 |
| | 100.00 |

In the above formulation the surfactants intended for use include anionic and nonionic versions. In certain cases cationic surfactants could be used, but they would be special cases. The blowing agent is a silicone or block copolymer surfactant used to control the cell size during the production of the urethane.

The polymer recommended for use as layer 14 is a hydrophilic polyurethane that reacts with water to form a foam "in situ" at room temperature or slightly warm temperatures. Polymers such as Trepol® A-62 (Rynel), Hypol® 3000 (Dow), etc. may be used. These are usually partially reacted mixtures of polyols and toluene di-isocyanate. All of the above ingredients are mixed in the water phase and then mixed with the polymer under controlled conditions and coated on the appropriate substrate. The resulting foam cures providing a tough, resilient open celled coating.

FIGS. 4–5 illustrate a variation of the invention wherein the portion of the laminate opposite foam layer 14 includes a thin coating 18 on the rinse side of the cloth 10A. The thin coating could be a hydrophilic polyurethane absorbent film coating containing super absorbent ingredients for final mop-up of the cleaning solution. The disposable cloth 10A of FIGS. 4–5 is designed to be dry. The consumer would moisten the cloth with water to activate the ingredients at the time of use. FIGS. 4–5 thus show how the invention can be practiced where only a portion, such as about one-half, of the area of the cloth contains the cleaning or scrubbing layer 14 with a major portion including substantially the other half being a rinse side which could include additional ingredients or as in FIGS. 1–3 could be free of other ingredients. Alternatively, the layer 14 could extend over the entire surface of the cloth.

FIG. 6 show a variation of this invention wherein the cloth 10B may be similar to cloth 10 shown in FIGS. 1–3, but is modified to provide a string mop affect. This could be achieved by forming a portion one or both of the outer layers 12 into individual strips 20 to form a string mop configuration. The portion which is cut into the individual strips would lie outwardly of the foam layer 14. The cut portion or string mop configuration would increase absorbency and cleaning ability a would result in an increased surface area in that both sides of the strips 20 would be used for leaning purposes. The invention could be practiced where both layers 12 would have the portions 20 outwardly of foam layer 14 cut into strips. Preferably, however, that the invention would b practiced where only one of the layers 12 has the string mop configuration and the other layer 12 is attached to the cleaning head of the broom or other implement.

Figure 7:
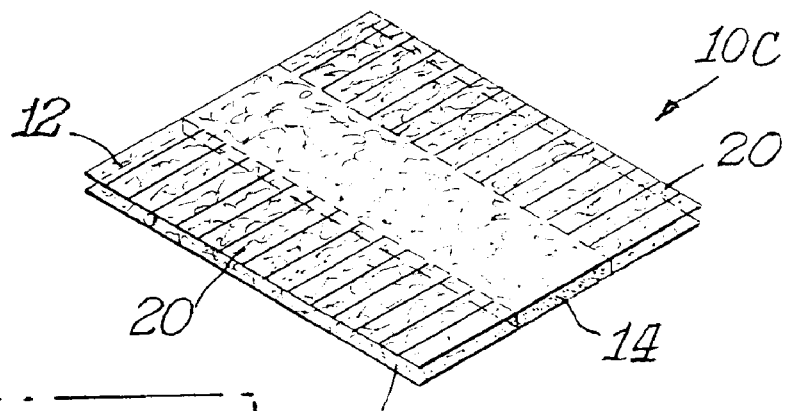
FIG. 7 is a perspective view of still yet another modified cleaning cloth in accordance with this invention; an FIG. 8 show the cleaning cloth mounted on a broom.
Figure 8:
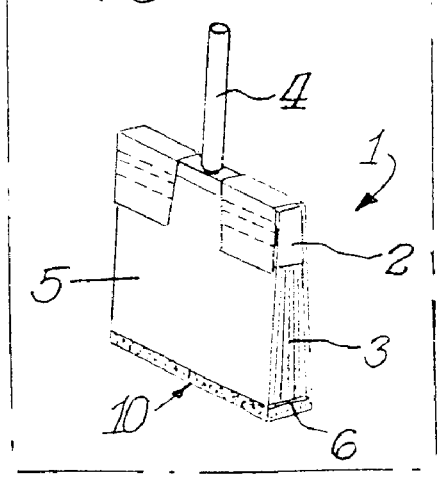

FIG. 7 shows a variation of the invention wherein the cloth 10C also has a string mop configuration. As shown in FIG. 7, however, the intermediate foam layer 14 is mounted in a central portion of the cloth thereby leaving portions of the outer layer 12 free of the foam layer on both sides of the foam layer. The string mop affect might be achieved by having cut strips 20 on one or both outer layers in the free portions extending from one or both sides outwardly of foam layer 14. Thus, FIG. 7 shows strips 20 to be located outwardly of foam layer 14 on both sides of the cloth 10C for one of the outer layers 12. As with the cloth 10B both of the layers 12 could be cut into strip form.

The location of the foam layer in a central portion of the cloth, as shown in FIG. 7, exemplifies that the invention could be practiced with the foam layer at different locations with or without the string mop configuration.

As previously noted, various materials could be used for the outer layers 12,12. Preferably, the layers 12,12 should be sufficiently porous to permit the cleaning action of the intermediate foam layer 14 to function by having its ingredients act through the outer layer. For cost convenience and efficiency purposes a non-woven material is preferred. Where layers 12,12 are identical with each other, each or either layer could be used as the cleaning or object contacting layer.

What is claimed is:

1. A disposable dual head cleaning cloth comprising a laminate having a pair of outer layers and a thin hydrophilic absorbent intermediate foam layer disposed between said outer layers and securing said outer layers together, said intermediate foam layer containing at least one cleaning ingredient, in combination with a broom having a cleaning head, said cleaning head having a plurality of bristles, a cover attachment on said cleaning head, each of said cover attachment and said cleaning head having a bottom, one of said outer layers being mounted directly against said cover attachment completely across said bottom of said cleaning head, and said cleaning cloth being detachably mounted to said cover attachment to completely cover said bottom of said cover attachment when said cleaning cloth is mounted to said cover attachment and to expose said bottom of said cover attachment when said cleaning cloth is detached from said cover attachment.

2. The cleaning cloth of claim 1 wherein said intermediate foam layer is located between said outer layers over only a portion of said outer layers with each of said outer layers including a free portion extending outwardly of said foam layer.

3. The cleaning cloth of claim 2 wherein said foam layer is disposed to one side of aid outer layers with a free portion being located on opposite sides of said foam layer.

4. The cleaning cloth of claim 3 wherein at least one of said outer layers is cut into strips at said free portion to create a string mop configuration.

5. The cleaning cloth of claim 2 wherein said foam layer is located centrally between said outer layers, and said tree portions being on each side outwardly of said foam layer.

6. The cleaning cloth of claim 5 wherein at least one of said tree portions of at least one of said outer layers is cut into strips to create a string mop configuration.

7. The cleaning cloth of claim 5 wherein both of said tree portions of both of said outer layers is cut into strips.

8. The cleaning cloth of claim 1 wherein said foam layer contains abrasive particles and a short fiber filler.

9. The cleaning cloth of claim 8 wherein said foam layer contains preservatives and/or fragrances.

10. The combination of claim 1 wherein said cover attachment includes hook fasteners, and said hook fasteners being engaged with one of said outer layers.

11. A disposable dual head cleaning cloth comprising a laminate having at least one outer layer, said one outer layer having a peripheral edge which includes a pair of opposite side edges with a center line equally between said side edges, a thin hydrophilic absorbent foam layer mounted against and secured to said one outer layer, said one outer layer having a tree portion outwardly of said foam layer, said foam layer containing at least one cleaning ingredient, said peripheral edge defining an area of said cloth, said foam layer eccentrically occupying from one-third to one-half of said area, said free portion of said one outer layer occupying at least one-third of said area, said opposite side edges comprising a first edge and a second edge, most of said foam layer being located between said first edge and said center line, most of said free portion being located between said second edge and said center line whereby said foam layer creates a cleaning section and said free portion creates a rinsing section, and said foam layer being confined to one side of said center line.

12. The cleaning cloth of claim 11 wherein said foam layer is located over one-half of said area.

13. The cleaning cloth of claim 11 wherein said foam layer is made of a polyurethane foam.

14. The cleaning cloth of claim 11 including a second outer layer, said foam layer being an intermediate layer between one outer layer and said second outer layer, and said foam layer securing said first outer layer and said second outer layer together.

15. The cleaning cloth of claim 14 wherein said free portion of at least one of said outer layers contains a cleaning agent.

16. The cleaning cloth of claim 14 wherein said outer layers are made of a nonwoven material.

17. The cleaning cloth of claim 14 wherein said second outer layer is of the same size and shape as said first outer layer, and said first outer layer being coterminous with said second outer layer.

18. The cleaning cloth of claim 14 wherein at least one of said free portions is cut into strips to create a string mop configuration.

19. The cleaning cloth of claim 11 wherein said cleaning cloth is in a dry condition.

20. The cleaning cloth of claim 11 wherein said cleaning cloth is in a premoistened condition.

21. The cleaning cloth of claim 11 including a coating on said one outer layer at said free portion.

22. The cleaning cloth of claim 21 wherein there is a hydrophilic film coating on said outer layer containing super absorbent ingredients.

23. A disposable dual head cleaning cloth comprising a laminate having at least one outer layer, said one outer layer having a peripheral edge which includes a pair of opposite side edges with a center line equally between said side edges, a thin hydrophilic absorbent foam layer mounted against and secured to said one outer layers said one outer layer having a free portion outwardly of said foam layer, said foam layer containing at least one cleaning ingredient, said peripheral edge defining an area of said cloth, said foam layer eccentrically occupying at least one-third of said area, said free portion of said one outer layer occupying at least one-half of said area, said opposite side edges comprising a first edge and a second edge, most of said foam layer being located between said first edge and said center line, most of said free portion being located between said second edge and said center line whereby said foam layer creates a cleaning section and said free portion creates a rinsing section, a second outer layer, said foam layer being an intermediate layer between one outer layer and said second outer layer, said foam layer securing said first outer layer and said second outer layer together, said second outer layer having a tree portion outwardly of said foam layer, and said free portions of said first outer layer and of said second outer layer being free of attachment to each other.

24. A disposable dual head cleaning cloth comprising a laminate having inner and cuter layers and a thin hydrophilic absorbent intermediate foam layer disposed between said outer layers and securing said cuter layers together, said intermediate foam layer containing at least one cleaning ingredient, said intermediate foam layer being located between said outer layers over only a portion of said outer layers with each of said outer layers including a free portion extending outwardly of said foam layer, said outer layers being unattached to each other at said free portion, said foam layer being located centrally between said outer layers, said tree portions being on each side outwardly of said foam layer, and both of said tree portions being cue into strips to create a string mop configuration.

25. The cleaning cloth of claim 24 wherein both of said outer layers is cut into strips at both of said free portions.

\* \* \* \* \*